United States Patent
Pettit et al.

(10) Patent No.: US 9,548,924 B2
(45) Date of Patent: Jan. 17, 2017

(54) DETECTING AN ELEPHANT FLOW BASED ON THE SIZE OF A PACKET

(71) Applicant: Nicira, Inc., Palo Alto, CA (US)

(72) Inventors: Justin Pettit, Los Altos Hills, CA (US); Martin Casado, Portola Valley, CA (US); Teemu Koponen, San Francisco, CA (US); Bruce Davie, Menlo Park, CA (US); W. Andrew Lambeth, San Mateo, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/231,652

(22) Filed: Mar. 31, 2014

(65) Prior Publication Data

US 2015/0163142 A1 Jun. 11, 2015

Related U.S. Application Data

(60) Provisional application No. 61/913,899, filed on Dec. 9, 2013.

(51) Int. Cl.
| | |
|---|---|
| *H04L 12/801* | (2013.01) |
| *H04L 12/803* | (2013.01) |
| *H04L 12/947* | (2013.01) |
| *H04L 12/935* | (2013.01) |
| *H04L 29/08* | (2006.01) |
| *H04L 12/26* | (2006.01) |

(52) U.S. Cl.
CPC ............ *H04L 47/11* (2013.01); *H04L 43/026* (2013.01); *H04L 47/125* (2013.01);
(Continued)

(58) Field of Classification Search
CPC .... H04L 29/06; H04L 47/125; H04L 47/2441; H04L 47/10; H04L 45/00; H04L 45/38; H04L 45/22; H04L 45/302
See application file for complete search history.

(56) References Cited

U.S. PATENT DOCUMENTS

| | | |
|---|---|---|
| 5,224,100 A | 6/1993 | Lee et al. |
| 5,245,609 A | 9/1993 | Ofek et al. |

(Continued)

FOREIGN PATENT DOCUMENTS

| | | | | |
|---|---|---|---|---|
| CA | WO 2004047377 A3 | * | 8/2004 | ............ H04L 45/00 |
| EP | 1154601 | | 11/2001 | |

(Continued)

OTHER PUBLICATIONS

Anwer, Muhammad Bilal, et al., "Building a Fast, Virtualized Data Plane with Programmable Hardware," Aug. 17, 2009, pp. 1-8, VISA'09, ACM Barcelona, Spain.

(Continued)

*Primary Examiner* — Bunjob Jaroenchonwanit
(74) *Attorney, Agent, or Firm* — Adeli LLP

(57) ABSTRACT

Some embodiments provide a forwarding element that inspects the size of each of several packets in a data flow to determine whether the data flow is an elephant flow. The forwarding element inspects the size because, in order for the packet to be of a certain size, the data flow had to already have gone through a slow start in which smaller packets are transferred and by definition be an elephant flow. When the forwarding element receives a packet in a data flow, the forwarding element identifies the size of the packet. The forwarding element then determines if the size of the packet is greater than a threshold size. If the size is greater, the forwarding element specifies that the packet's data flow is an elephant flow.

20 Claims, 8 Drawing Sheets

(52) U.S. Cl.
CPC ........ *H04L 49/252* (2013.01); *H04L 49/3009* (2013.01); *H04L 67/10* (2013.01)

(56) References Cited

U.S. PATENT DOCUMENTS

| | | | |
|---|---|---|---|
| 5,265,092 A | 11/1993 | Soloway et al. | |
| 5,504,921 A | 4/1996 | Dev et al. | |
| 5,550,816 A | 8/1996 | Hardwick et al. | |
| 5,668,810 A * | 9/1997 | Cannella, Jr. | H04L 12/56 348/E7.056 |
| 5,729,685 A | 3/1998 | Chatwani et al. | |
| 5,751,967 A | 5/1998 | Raab et al. | |
| 5,781,534 A | 7/1998 | Perlman et al. | |
| 6,104,699 A | 8/2000 | Holender et al. | |
| 6,104,700 A | 8/2000 | Haddock et al. | |
| 6,141,738 A | 10/2000 | Munter et al. | |
| 6,219,699 B1 | 4/2001 | McCloghrie et al. | |
| 6,430,160 B1 | 8/2002 | Smith et al. | |
| 6,456,624 B1 | 9/2002 | Eccles et al. | |
| 6,512,745 B1 | 1/2003 | Abe et al. | |
| 6,539,432 B1 | 3/2003 | Taguchi et al. | |
| 6,658,002 B1 | 12/2003 | Ross et al. | |
| 6,680,934 B1 | 1/2004 | Cain | |
| 6,721,334 B1 | 4/2004 | Ketcham | |
| 6,785,843 B1 | 8/2004 | McRae et al. | |
| 6,941,487 B1 | 9/2005 | Balakrishnan et al. | |
| 6,963,585 B1 | 11/2005 | Le Pennec et al. | |
| 6,999,454 B1 | 2/2006 | Crump | |
| 7,012,919 B1 * | 3/2006 | So | H04L 41/5019 370/235 |
| 7,079,544 B2 | 7/2006 | Wakayama et al. | |
| 7,149,817 B2 * | 12/2006 | Pettey | H04L 29/06 709/200 |
| 7,149,819 B2 * | 12/2006 | Pettey | H04L 29/06 709/200 |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,283,473 B2 | 10/2007 | Arndt et al. | |
| 7,342,916 B2 | 3/2008 | Das et al. | |
| 7,362,752 B1 * | 4/2008 | Kastenholz | H04L 41/12 370/389 |
| 7,370,120 B2 * | 5/2008 | Kirsch | H04L 29/06 380/269 |
| 7,391,771 B2 | 6/2008 | Orava et al. | |
| 7,450,598 B2 | 11/2008 | Chen et al. | |
| 7,463,579 B2 | 12/2008 | Lapuh et al. | |
| 7,478,173 B1 | 1/2009 | Delco | |
| 7,483,370 B1 | 1/2009 | Dayal et al. | |
| 7,533,176 B2 * | 5/2009 | Freimuth | H04L 49/90 370/235 |
| 7,555,002 B2 | 6/2009 | Arndt et al. | |
| 7,606,260 B2 | 10/2009 | Oguchi et al. | |
| 7,627,692 B2 | 12/2009 | Pessi | |
| 7,633,955 B1 | 12/2009 | Saraiya et al. | |
| 7,634,622 B1 * | 12/2009 | Musoll | G06F 9/3851 370/375 |
| 7,640,353 B2 * | 12/2009 | Shen | H04L 12/00 709/230 |
| 7,643,488 B2 | 1/2010 | Khanna et al. | |
| 7,649,851 B2 | 1/2010 | Takashige et al. | |
| 7,706,266 B2 | 4/2010 | Plamondon | |
| 7,710,874 B2 | 5/2010 | Balakrishnan et al. | |
| 7,760,735 B1 | 7/2010 | Chen et al. | |
| 7,764,599 B2 | 7/2010 | Doi et al. | |
| 7,792,987 B1 | 9/2010 | Vohra et al. | |
| 7,802,000 B1 | 9/2010 | Huang et al. | |
| 7,808,919 B2 | 10/2010 | Nadeau et al. | |
| 7,808,929 B2 | 10/2010 | Wong et al. | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,885,276 B1 | 2/2011 | Lin | |
| 7,936,770 B1 | 5/2011 | Frattura et al. | |
| 7,937,438 B1 | 5/2011 | Miller et al. | |
| 7,937,492 B1 | 5/2011 | Kompella et al. | |
| 7,940,763 B1 * | 5/2011 | Kastenholz | H04L 12/2856 370/255 |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,027,354 B1 | 9/2011 | Portolani et al. | |
| 8,031,606 B2 | 10/2011 | Memon et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,875 B1 | 11/2011 | Lambeth | |
| 8,131,852 B1 | 3/2012 | Miller et al. | |
| 8,149,737 B2 | 4/2012 | Metke et al. | |
| 8,155,028 B2 | 4/2012 | Abu-Hamdeh et al. | |
| 8,161,270 B1 | 4/2012 | Parker et al. | |
| 8,166,201 B2 | 4/2012 | Richardson et al. | |
| 8,199,750 B1 | 6/2012 | Schultz et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,265,075 B2 | 9/2012 | Pandey | |
| 8,281,067 B2 | 10/2012 | Stolowitz | |
| 8,312,129 B1 | 11/2012 | Miller et al. | |
| 8,339,959 B1 | 12/2012 | Moisand et al. | |
| 8,339,994 B2 | 12/2012 | Gnanasekaran et al. | |
| 8,345,558 B2 | 1/2013 | Nicholson et al. | |
| 8,351,418 B2 | 1/2013 | Zhao et al. | |
| 8,355,328 B2 | 1/2013 | Matthews et al. | |
| 8,456,984 B2 | 6/2013 | Ranganathan et al. | |
| 8,504,718 B2 | 8/2013 | Wang et al. | |
| 8,571,031 B2 | 10/2013 | Davies et al. | |
| 8,611,351 B2 | 12/2013 | Gooch et al. | |
| 8,612,627 B1 | 12/2013 | Brandwine | |
| 8,619,731 B2 * | 12/2013 | Montemurro | H04L 47/10 370/338 |
| 8,625,594 B2 | 1/2014 | Safrai et al. | |
| 8,625,603 B1 | 1/2014 | Ramakrishnan et al. | |
| 8,625,616 B2 | 1/2014 | Vobbilisetty et al. | |
| 8,644,188 B1 | 2/2014 | Brandwine et al. | |
| 8,762,501 B2 | 6/2014 | Kempf et al. | |
| 8,819,259 B2 * | 8/2014 | Zuckerman | H04L 67/1097 709/231 |
| 8,838,743 B2 | 9/2014 | Lewites et al. | |
| 8,976,814 B2 * | 3/2015 | Dipasquale | H04L 12/6418 370/474 |
| 9,032,095 B1 * | 5/2015 | Traina | H04L 29/06 370/389 |
| 2001/0043614 A1 | 11/2001 | Viswanadham et al. | |
| 2002/0062422 A1 * | 5/2002 | Butterworth | G06F 11/0727 711/114 |
| 2002/0093952 A1 | 7/2002 | Gonda | |
| 2002/0194369 A1 | 12/2002 | Rawlins et al. | |
| 2003/0041170 A1 | 2/2003 | Suzuki | |
| 2003/0058850 A1 | 3/2003 | Rangarajan et al. | |
| 2003/0063556 A1 * | 4/2003 | Hernandez | H04L 27/2614 370/208 |
| 2003/0093341 A1 * | 5/2003 | Millard | G06Q 30/04 705/34 |
| 2003/0191841 A1 * | 10/2003 | DeFerranti | H04L 12/14 709/226 |
| 2004/0073659 A1 | 4/2004 | Rajsic et al. | |
| 2004/0098505 A1 | 5/2004 | Clemmensen | |
| 2004/0186914 A1 | 9/2004 | Shimada | |
| 2004/0264472 A1 * | 12/2004 | Oliver | H04L 12/5693 370/395.4 |
| 2004/0267866 A1 | 12/2004 | Carollo et al. | |
| 2004/0267897 A1 | 12/2004 | Hill et al. | |
| 2005/0018669 A1 | 1/2005 | Arndt et al. | |
| 2005/0027881 A1 | 2/2005 | Figueira et al. | |
| 2005/0053079 A1 | 3/2005 | Havala | |
| 2005/0083953 A1 | 4/2005 | May | |
| 2005/0111445 A1 | 5/2005 | Wybenga et al. | |
| 2005/0120160 A1 | 6/2005 | Plouffe et al. | |
| 2005/0132044 A1 | 6/2005 | Guingo et al. | |
| 2005/0182853 A1 | 8/2005 | Lewites et al. | |

(56) References Cited

U.S. PATENT DOCUMENTS

| | | |
|---|---|---|
| 2005/0220096 A1 | 10/2005 | Friskney et al. |
| 2005/0232230 A1 | 10/2005 | Nagami et al. |
| 2006/0002370 A1 | 1/2006 | Rabie et al. |
| 2006/0026225 A1 | 2/2006 | Canali et al. |
| 2006/0028999 A1 | 2/2006 | Iakobashvili et al. |
| 2006/0029056 A1 | 2/2006 | Perera et al. |
| 2006/0037075 A1 | 2/2006 | Frattura et al. |
| 2006/0104286 A1* | 5/2006 | Cheriton ............ G06F 17/30949 370/395.32 |
| 2006/0140118 A1* | 6/2006 | Alicherry ............... H04J 3/1617 370/235 |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0206655 A1 | 9/2006 | Chappell et al. |
| 2006/0221961 A1 | 10/2006 | Basso et al. |
| 2006/0246900 A1* | 11/2006 | Zheng ................. H04L 12/5695 455/435.3 |
| 2006/0262778 A1* | 11/2006 | Haumont ............... H04L 63/164 370/356 |
| 2006/0282895 A1 | 12/2006 | Rentzis et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0156919 A1 | 7/2007 | Potti et al. |
| 2007/0258382 A1* | 11/2007 | Foll ..................... H04L 12/2602 370/252 |
| 2007/0260721 A1 | 11/2007 | Bose et al. |
| 2007/0283412 A1* | 12/2007 | Lie ........................ H04W 12/08 726/1 |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0049614 A1 | 2/2008 | Briscoe et al. |
| 2008/0049621 A1 | 2/2008 | McGuire et al. |
| 2008/0049786 A1 | 2/2008 | Ram et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | de Heer |
| 2008/0240095 A1 | 10/2008 | Basturk |
| 2009/0006607 A1* | 1/2009 | Bu ......................... H04L 43/028 709/224 |
| 2009/0010254 A1 | 1/2009 | Shimada |
| 2009/0046581 A1* | 2/2009 | Eswaran ............. H04L 43/0876 370/230 |
| 2009/0150527 A1 | 6/2009 | Tripathi et al. |
| 2009/0292858 A1 | 11/2009 | Lambeth et al. |
| 2010/0128623 A1 | 5/2010 | Dunn et al. |
| 2010/0131636 A1 | 5/2010 | Suri et al. |
| 2010/0157942 A1* | 6/2010 | An ..................... H04W 36/0077 370/331 |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0257263 A1* | 10/2010 | Casado .................. H04L 49/00 709/223 |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0075664 A1 | 3/2011 | Lambeth et al. |
| 2011/0085461 A1* | 4/2011 | Liu ......................... H04L 43/12 370/252 |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0164503 A1* | 7/2011 | Yong ...................... H04L 69/22 370/237 |
| 2011/0194567 A1 | 8/2011 | Shen |
| 2011/0202920 A1 | 8/2011 | Takase |
| 2011/0249970 A1* | 10/2011 | Eddleston ............... H04L 12/18 398/58 |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2011/0317696 A1 | 12/2011 | Aldrin et al. |
| 2012/0054367 A1 | 3/2012 | Ramakrishnan et al. |
| 2012/0079478 A1 | 3/2012 | Galles et al. |
| 2012/0131222 A1* | 5/2012 | Curtis .................. H04L 47/2441 709/235 |
| 2012/0159454 A1 | 6/2012 | Barham et al. |
| 2012/0182992 A1 | 7/2012 | Cowart et al. |
| 2012/0243539 A1* | 9/2012 | Keesara ................. H04L 45/66 370/392 |
| 2012/0287791 A1 | 11/2012 | Xi et al. |
| 2013/0024579 A1 | 1/2013 | Zhang et al. |
| 2013/0054761 A1 | 2/2013 | Kempf et al. |
| 2013/0058346 A1 | 3/2013 | Sridharan et al. |
| 2013/0064088 A1* | 3/2013 | Yu ........................ H04L 45/38 370/235 |
| 2013/0067067 A1 | 3/2013 | Miri et al. |
| 2013/0163427 A1 | 6/2013 | Beliveau et al. |
| 2013/0163475 A1 | 6/2013 | Beliveau et al. |
| 2013/0286846 A1* | 10/2013 | Atlas ...................... H04L 45/34 370/236 |
| 2013/0287026 A1* | 10/2013 | Davie ..................... H04L 49/70 370/392 |
| 2013/0322248 A1* | 12/2013 | Guo ...................... H04L 45/507 370/235 |
| 2013/0332602 A1 | 12/2013 | Nakil et al. |
| 2013/0339544 A1 | 12/2013 | Mithyantha |
| 2014/0019639 A1 | 1/2014 | Ueno |
| 2014/0029451 A1 | 1/2014 | Nguyen |
| 2014/0108738 A1* | 4/2014 | Kim ..................... G06F 12/0891 711/136 |
| 2014/0115578 A1 | 4/2014 | Cooper et al. |
| 2014/0119203 A1 | 5/2014 | Sundaram et al. |
| 2014/0173018 A1* | 6/2014 | Westphal ............. H04L 41/0823 709/213 |
| 2014/0195666 A1 | 7/2014 | Dumitriu et al. |
| 2014/0233421 A1* | 8/2014 | Matthews ........... H04L 43/0888 370/253 |
| 2014/0281030 A1 | 9/2014 | Cui et al. |
| 2014/0372616 A1* | 12/2014 | Arisoylu .............. H04L 67/1029 709/226 |
| 2015/0016255 A1* | 1/2015 | Bisht ..................... H04L 47/11 370/235 |
| 2015/0071072 A1* | 3/2015 | Ratzin ................... H04L 47/11 370/235 |
| 2015/0106804 A1* | 4/2015 | Chandrashekhar ..... H04L 45/64 718/1 |
| 2015/0120959 A1* | 4/2015 | Bennett ................. H04L 47/10 709/233 |
| 2015/0124825 A1* | 5/2015 | Dharmapurikar ... H04L 45/7453 370/392 |
| 2015/0163117 A1 | 6/2015 | Lambeth et al. |
| 2015/0163144 A1 | 6/2015 | Koponen et al. |
| 2015/0163145 A1 | 6/2015 | Pettit et al. |
| 2015/0163146 A1* | 6/2015 | Zhang ................. H04L 47/125 370/238 |
| 2015/0172075 A1* | 6/2015 | DeCusatis ........... H04L 12/4633 370/235 |
| 2015/0180769 A1* | 6/2015 | Wang ................... H04L 45/586 370/236 |
| 2015/0237097 A1 | 8/2015 | Devireddy et al. |

FOREIGN PATENT DOCUMENTS

| | | |
|---|---|---|
| JP | 2002-141905 | 5/2002 |
| JP | 2003-069609 | 3/2003 |
| JP | 2003-124976 | 4/2003 |
| JP | 2003-318949 | 11/2003 |

(56) References Cited

FOREIGN PATENT DOCUMENTS

| WO | WO 95/06989 | 3/1995 |
|---|---|---|
| WO | WO 2012/126488 | 9/2012 |
| WO | WO 2013/184846 | 12/2013 |

OTHER PUBLICATIONS

Author Unknown, "Open vSwitch, An Open Virtual Switch," Dec. 30, 2010, 2 pages.

Author Unknown, "OpenFlow Switch Specification, Version 0.9.0 (Wire Protocol 0x98)," Jul. 20, 2009, pp. 1-36, Open Networking Foundation.

Author Unknown, "OpenFlow Switch Specification, Version 1.0.0 (Wire Protocol 0x01)," Dec. 31, 2009, pp. 1-42, Open Networking Foundation.

Author Unknown, "OpenFlow Switch Specification, Version 1.1.0 Implemented (Wire Protoco 0x02)," Feb. 28, 2011, pp. 1-56, Open Networking Foundation.

Casado, Martin, et al. "Ethane: Taking Contol of the Enterprise," SIGCOMM'07 Aug. 27-31, 2007, pp. 1-12, ACM, Kyoto, Japan.

Curtis, Andrew R., et al., "DevoFlow: Scaling Flow Management for High-Performance Networks," Aug. 15, 2011, pp. 254-265, SIGCOMM, ACM.

Das, Saurav, et al. "Simple Unified Control for Packet and Circuit Networks," Month Unknown, 2009, pp. 147-148, IEEE.

Das, Saurav, et al., "Unifying Packet and Circuit Switched Networks with OpenFlow," Dec. 7, 2009, 10 pages.

Fernandes, Natalia C., et al., "Virtual networks:isolation, performance, and trends," Oct. 7, 2010, 17 pages, Institut Telecom and Springer-Verlag.

Foster, Nate, et al., "Frenetic: A Network Programming Language," ICFP '11, Sep. 19-21, 2011, 13 pages, Tokyo, Japan.

Greenhalgh, Adam, et al., "Flow Processing and the Rise of Commodity Network Hardware," ACM SIGCOMM Computer Communication Review, Apr. 2009, pp. 21-26, vol. 39, No. 2.

Gude, Natasha, et al., "NOX:Towards an Operating System for Networks" Jul. 2008, pp. 105-110, vol. 38, No. 3, ACM SIGCOMM Computer communication Review.

Hinrichs, Timothy L., et al., "Practical Declarative Network Management," WREN'09, Aug. 21, 2009, pp. 1-10, Barcelona, Spain.

Koponen, Teemu, et al., "Network Virtualization in Multi-tenant Datacenters," Aug. 2013, pp. 1-22, VMware, Inc., Palo Alto, California, USA.

Koponen, Teemu, et al., "Onix: A Distributed Control Platform for Large-scale Production Networks," In Proc. OSDI, Oct. 2010, pp. 1-14.

Loo, Boon Thau, et al., "Declarative Routing: Extensible Routing with Declarative Queries," In Proc. of SIGCOMM, Aug. 21-26, 2005, 12 pages, Philadelphia, PA, USA.

Loo, Boon Thau, et al., "Implementing Declarative Overlays" In Proc. of SOSP, Oct. 2005, 16 pages. Brighton, United Kingdom.

Matsumoto, Nobutaka, et al., "LightFlow: Speeding Up GPU-based Flow Switching and Facilitating Maintenance of Flow Table," 2012 IEEE 13th International Conference on High Performance Switching and Routing, Jun. 24, 2012, pp. 76-81, IEEE.

McKeown, Nick, et al., "OpenFlow: Enabling Innovation in Campus Networks" ACS SIGCOMM Computer communication Review, Apr. 2008, pp. 69-74, vol. 38, No. 2.

Nygren, Anders, et al., OpenFlow Switch Specification, Version 1.3.4 (Protocol version 0x04), Mar. 27, 2014, pp. 1-84, Open Networking Foundation. (Part 1 of 2).

Nygren, Anders, et al., OpenFlow Switch Specification, Version 1.3.4 (Protocol version 0x04), Mar. 27, 2014, pp. 85-171, Open Networking Foundation. (Part 2 of 2).

Pettit, Justin, et al., "Virtual Switching in an Era of Advanced Edges" Sep. 2010, 7 pages.

Pfaff, B., et al., "The Open vSwitch Database Management Protocol," draft-pfaff-ovsdb-proto-00. Aug. 20, 2012, pp. 1-34, Nicira, Inc., Palo Alto, California, USA.

Pfaff, Ben, et al., "OpenFlow Switch Specification," Sep. 6, 2012, 128 pages, The Open Networking Foundation.

Pfaff, Ben., et al., "Extending Networking into the Virtualization Layer," Proc. of HotNets, Oct. 2009, pp. 1-6.

Phaal, Peter, et al., "sFlow Version 5," Jul., 2004, 46 pages, sFlow.org.

Phan, Doantam, et al., "Visual Analysis of Network Flow Data with Timelines and Event Plots," month unknown, 2007, pp. 1-16, VizSEC.

Popa, Lucian, et al., "Building Extensible Networks with Rule-Based Forwarding," In USENIX OSDI, Month Unknown, 2010, pp. 1-14.

Sherwood, Rob, et al., "Carving Research Slices Out of Your Production Networks with OpenFlow," ACM SIGCOMM Computer Communications Review, Jan. 2010, pp. 129-130, vol. 40, No. 1.

Sherwood, Rob, et al., "FlowVisor: A Network Virtualization Layer," Oct. 14, 2009, pp. 1-14, OPENFLOW-TR-2009-1.

Tavakoli, Arsalan, et al., "Applying NOX to the Datacenter,"month unknown, 2009 6 pages, Proceedings of HotNets.

Yu, Minlan, et al., "Scalable Flow-Based Networking with DIFANE," Aug. 2010, pp. 1-16, In Proceedings of SIGCOMM.

Portions of prosecution history of U.S. Appl. No. 14/231,647, filed Jul. 7, 2016, Koponen, Teemu, et al.

Portions of prosecution history of U.S. Appl. No. 14/231,654, filed Mar. 14, 2016, Pettit, Justin, et al.

Portions of prosecution history of U.S. Appl. No. 14/502,102, filed May 16, 2016, Lambeth, W. Andrew, et al.

\* cited by examiner

DETECTING AN ELEPHANT FLOW BASED ON THE SIZE OF A PACKET

CLAIM OF BENEFIT TO PRIOR APPLICATIONS

This application claims the benefit of U.S. Provisional Patent Application 61/913,899, entitled "Detecting and Handling Elephant Flows", filed on Dec. 9, 2013. U.S. Provisional Patent Application 61/913,899 is incorporated herein by reference.

BACKGROUND

Today, a datacenter may process different types of flows, including elephant flows and mouse flows. An elephant flow represents a long-lived flow or a continuous traffic flow that is typically associated with high volume connection. Different from an elephant flow, a mouse flow represents a short-lived flow. Mice are often associated with bursty, latency-sensitive applications, whereas elephants tend to be associated with large data transfers in which throughput is far more important than latency.

A problem with elephant flows is that they tend to fill network buffers end-to-end, and this introduces non-trivial queuing delay to anything that shares these buffers. For instance, a forwarding element may be responsible for managing several queues to forward packets, and several packets belonging to a mouse flow may be stuck in the same queue behind a group of other packets belonging to an elephant flow. In a network of elephants and mice, this means that the more latency-sensitive mice are being affected. Another problem is that mice are generally very bursty, so adaptive routing techniques are not effective with them.

BRIEF SUMMARY

Some embodiments provide a forwarding element that inspects the size of each of several packets in a data flow to determine whether the data flow is an elephant flow. The forwarding element inspects the size because, in order for the packet to be of a certain size, the data flow had to already have gone through a slow start in which smaller packets are transferred and by definition be an elephant flow. As an example, the Transmission Control Protocol (TCP) uses a slow start algorithm in order to avoid congesting the network with an inappropriately large burst of data. The TCP also uses the algorithm to slowly probe the network to determine the available capacity. The forwarding element of some embodiments takes advantage of such a slow start algorithm by using it to detect elephant flows.

When the forwarding element receives a packet in a data flow, the forwarding element identifies the size of the packet. The forwarding element then determines if the size of the packet is greater than a threshold size. If the size is greater, the forwarding element specifies that the packet's data flow is an elephant flow. If the size is not greater, the forward element processes the packet normally (e.g. forwards the packet) without any additional processing due to the size of the packet.

In some embodiments, the forwarding element does not examine the sizes of all packets but only examine the sizes of certain packets. This is because there can be many different types of packets flowing through the network, such as (Address Resolution Protocol ARP) packets, unicast flood packets, etc. The forwarding element of some embodiments selectively examines packets associated with a data flow from a network host. The forwarding element of some embodiments selectively examines packets associated with a data to a network host. In some embodiments, the forwarding element accomplishes this by looking at the sizes of packets associated with one or more flow entries in its flow table(s). In some embodiments, the forwarding element monitors the sizes of packets sent over a tunnel that is established between two network hosts.

To selectively examine certain packets, the forwarding element of some embodiments installs a flow entry with a conditional action in the flow table. Typically, an action specifies dropping the packet or outputting the packet to one or more egress ports. However, the flow's conditional action specifies that, if the packet exceeds a certain size, the packet should be sent to another component (e.g., a daemon process) of the forwarding element for further processing. The component may then identify one or more pieces of information associated with the packet that can be used to identify the elephant flow or other packets belonging to the same elephant flow.

In some embodiments, the forwarding element is a hardware-forwarding element. In some embodiments, the forwarding element is a software forwarding element. In some embodiments, the forwarding element is an edge forwarding element that is in a unique position to check the sizes of different packets before they are segmented into maximum transmission unit (MTU) sized packets by a network interface controller or card (NIC). This is important because a non-edge forwarding element that is not in such a unique position may not be able to detect elephant flows based solely on packet size. For instance, if the MTU size is less than the threshold size, then the non-edge forwarding element will not be able to use packet size to differentiate packets belonging to elephant flows from other packets belonging to mice flows.

In some embodiments, when an elephant flow is detected, the forwarding element identifies various pieces of information that can be used to identify packets belonging to the elephant flow. The forwarding element may identify tunnel information, such as the tunnel ID, the IP address of the source tunnel endpoint (e.g., the hypervisor), and the IP address of the destination tunnel endpoint. The forwarding element of some embodiments identifies the elephant flow packet's ingress port, source transport layer (e.g., UDP or TCP) port, destination transport layer port, Ethernet type, source Ethernet address, destination Ethernet address, source IP address, and/or destination IP address.

Once an elephant flow is detected, the forwarding element of some embodiments treats the detected elephant flow differently than other flows (e.g., mouse flows, non-detected elephant flows). The forwarding element may send packets associated with an elephant flow along different paths (e.g., equal-cost multipath routing (ECMP) legs) to break the elephant flow into mice flows. As another example, the forwarding element may send elephant flow traffic along a separate physical network, such as an optical network that is more suitable for slow changing, bandwidth-intensive traffic. In some embodiments, the forwarding element reports the elephant flow to a network controller (e.g., a software-defined networking controller) that can configure one or more other forwarding elements to handle the elephant flow. To notify another forwarding element, the forwarding element may mark packets associated with the detected elephant flow. When notified, the other forwarding element may perform Quality of Service (QOS) configuration to place packets belonging to the elephant flow in a particular queue that is separate from one or more other queues with other packets, break the elephant flow into mice flows, etc.

Additional techniques for detecting and handling elephant flows are described in U.S. patent application Ser. No. 14/231,647, entitled "Detecting and Handling Elephant Flows", filed concurrently with this application, and now published as U.S. Patent Publication 2015/0163144. Some embodiments that report elephant flows to a network controller are described in U.S. patent application Ser. No. 14/231,654, entitled "Reporting Elephant Flows to a Network Controller", filed concurrently with this application, and now published as U.S. Patent Publication 2015/0163145. These U.S. patent applications, now published respectively as U.S Patent Publications 2015/0163144 and 2015/0163145, are incorporated herein by reference. Furthermore, some embodiments provide a system that detects an elephant flow by examining the operations of a machine. In some embodiments, the machine is a physical machine or a virtual machine (VM). In detecting, the system identifies an initiation of a new data flow associated with the machine. The new data flow can be an outbound data flow or an inbound data flow. The system then determines, based on the amount of data being sent or received, if the data flow is an elephant flow.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Embodiments described herein provide a forwarding element that inspects the size of each of several packets in a data flow to determine whether the data flow is an elephant flow. The forwarding element inspects the size because, in order for the packet to be of a certain size, the data flow had to already have gone through a slow start in which smaller packets are transferred and by definition be an elephant flow. As an example, the Transmission Control Protocol (TCP) uses a slow start algorithm in order to avoid congesting the network with an inappropriately large burst of data. The TCP also uses the algorithm to slowly probe the network to determine the available capacity. The forwarding element of some embodiments takes advantage of such a slow start algorithm by using it to detect elephant flows.

Figure 1:
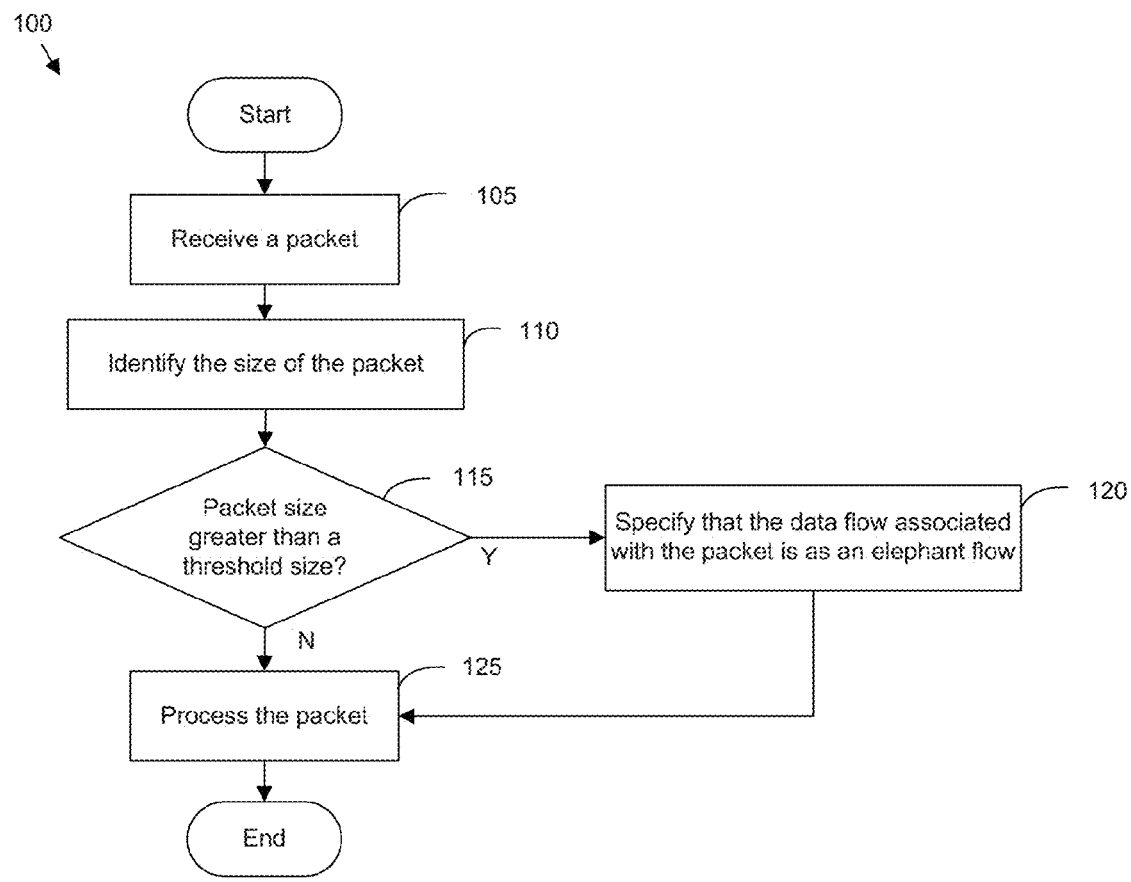
FIG. 1 conceptually illustrates a process that some embodiments implement to detect an elephant flow by taking into account the size of a packet.

FIG. 1 conceptually illustrates a process 100 that some embodiments implement to detect an elephant flow by taking into account the size of a packet. The process 100 will be described by reference to FIG. 2, which conceptually illustrates how the size of a packet in a TCP session can change over time. In some embodiments, the process 100 is performed by a forwarding element, such as a switch or a router.

The term "packet" is used here as well as throughout this application to refer to a collection of bits in a particular format sent across a network. One of ordinary skill in the art will recognize that the term "packet" may be used herein to refer to various formatted collections of bits that may be sent across a network, such as Ethernet frames, TCP segments, UDP datagrams, IP packets, etc.

As shown in FIG. 1, the process 100 begins when it receives (at 105) a packet. The process 100 then identifies (at 110) the size of the packet. At 115, the process 100 determines whether the packet size is greater than a threshold size. If the packet size is greater than the threshold size, the process 100 specifies (at 120) the data flow associated with the packet as an elephant flow. Otherwise, the process 100 proceeds to 125, which is described below.

Figure 2:
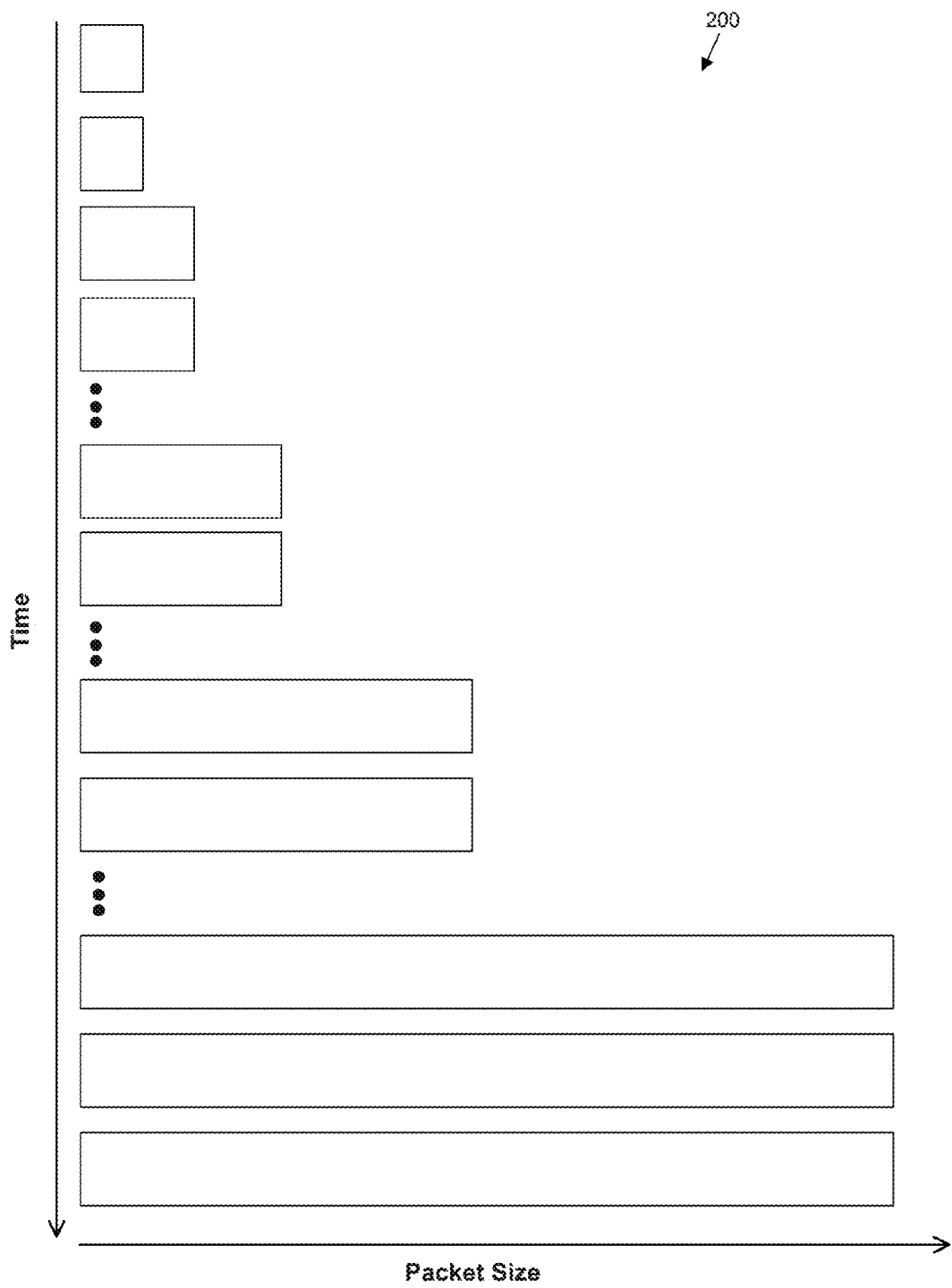
FIG. 2 conceptually illustrates an example of how the size of TCP packets can change during a TCP session.

FIG. 2 conceptually illustrates an example of how the size of TCP packets can change during a TCP session. The figure shows a graph 200. The y-axis of the graph represents time, starting with the "slow start" of the data transmission at the top. The x-axis of the graph represents the size of the packet. To simplify the description, the figure shows only several packets. The first few packets represent the start of a TCP session. The packets increase in size over time until the packet size reaches a particular size or until a loss occurs. For instance, when a loss occurs, the size of the packet may decrease rather than increase.

The show-start algorithm can begin in an exponential growth phase initially with a Congestion Window Size (CWND) of 1, 2 or 10 segments and increases it by one segment size for each new acknowledgement (ACK) that is received. If the receiver sends an ACK for every segment, this behavior effectively doubles the window size each round trip of the network. If the receiver supports delayed ACKs, the rate of increase is lower, but still increases by a minimum of one segment size each round-trip time. This behavior can continue until the congestion window size (CWND) reaches the size of the receiver's advertised window or until a loss occurs, in some embodiments.

As shown in FIG. 2, the size of the packets increases over time. At some point in time, when the size of a packet reaches a threshold value or size, the process 100 can specify that the data flow associated with the packet is an elephant flow. If the packet size does not reach the threshold value, the process 100 of some embodiments operates normally (e.g., forwarding and/or dropping packets). In other words, the process 100 of some embodiments assumes that all data flows are mice flows until there is evidence that one or more of the data flows are elephant flows.

Referring to FIG. 1, the process 100 processes (at 125) the packet. Here, the process 100 might perform typical switching operations, such as dropping or forwarding the packet. If an elephant flow has been detected, the process 100 might process the packet differently. In some embodiments, when an elephant flow is detected, the process 100 identifies various pieces of information that can be used to identify packets belonging to the elephant flow. The process 100 may identify tunnel information, such as the tunnel ID, the IP address of the source tunnel endpoint (e.g., the hypervisor), and the IP address of the destination tunnel endpoint. The process 100 of some embodiments identifies the elephant flow packet's ingress port, source transport layer (e.g., UDP or TCP) port, destination transport layer port, Ethernet type, source Ethernet address, destination Ethernet address, source IP address, and/or destination IP address.

In some embodiments, the process 100 does not examine the sizes of all packets but only examine the sizes of certain packets. This is because there can be many different types of packets flowing through the network, such as (Address Resolution Protocol ARP) packets, unicast flood packets, etc. The process 100 of some embodiments selectively examines packets associated with a set of network hosts. In some embodiments, the process 100 accomplishes this by looking at the sizes of packets associated with one or more flow entries in a set of flow table.

The process of some embodiments does not examine the sizes of all packets. In some embodiments, the process examines packets associated with a data flow from a network host. Alternatively, or conjunctively, the process of some embodiments examines packets that are destined for the network host. In other words, the process of some embodiments only examines inbound traffic to and/or outbound traffic from a network host.

To selectively examine certain packets, the process 100 of some embodiments installs a flow entry with a conditional action in the flow table. Typically, an action specifies dropping the packet or outputting the packet to one or more egress ports. However, the flow's conditional action specifies that, if the packet exceeds a certain size, the packet should be sent to another component (e.g., a daemon process) of the forwarding element for further processing. The component may then identify one or more pieces of information associated with the packet that can be used to identify the elephant flow or other packets in the same elephant flow.

Some embodiments perform variations on the process 100. The specific operations of the process 100 may not be performed in the exact order shown and described. The specific operations may not be performed in one continuous series of operations, and different specific operations may be performed in different embodiments.

In the example process of FIG. 1, the process 100 is detecting an elephant flow by keying on a large packet (e.g., TCP packet). For instance, in order for a flow's TCP window to get sufficiently large, it must get past the slow start and can therefore be considered an elephant flow. The benefit of this approach is that detecting elephants is quite cheap and can be done on a per-tunnel basis instead of a per-flow one. That is, different from examining statistics relating to flows entries (e.g., in a flow table), this approach examines tunnel traffic to detect elephants. The disadvantage of this approach is that it may potentially only work with TCP (e.g., and not UDP). Also, depending on the implementation, this approach may only be able to detect an elephant if the sender can send greater than maximum transmission unit (MTU)-sized segments.

In addition, as mentioned above, the process 100 of some embodiments is performed by a forwarding element. In some embodiments, the forwarding element is a hardware-forwarding element. The hardware forwarding element may have application-specific integrated circuits (ASICs) that are specifically designed to support in-hardware forwarding. In some embodiments, the forwarding element is a software forwarding element, such as Open vSwitch (OVS). Different from a hardware forwarding element, the software forwarding element may operate on an x86 box or a computing device (e.g., a host machine). In some embodiments, the forwarding element (e.g., software or hardware forwarding element) is a physical forwarding element that operates in conjunction with one or more other physical forwarding elements to collectively implement different logical forwarding elements (e.g., logical switches, logical routers, etc.) for different logical networks of different tenants, users, departments, etc. that use the same shared computing and networking resources. Accordingly, the term "physical forwarding element" is used herein to differentiate it from a logical forwarding element.

In some embodiments, the forwarding element is an edge forwarding element that is in a unique position to check the sizes of different packets before they are segmented into MTU-sized packets by a NIC. This is important because a non-edge forwarding element that is not in such a unique position may not be able to detect an elephant flow based solely on packet size. For instance, if the MTU size is less than the threshold size, then the non-edge forwarding element will not be able to use packet size to differentiate packets belonging to elephant flows and other packets belonging to mice flows.

Several more examples of detection and handling elephant flows will be described in detail below. Specifically, Section I describes examples of how some embodiments detect elephant flows based on packet size. This is followed by Section II, which describes an example logical forwarding element that uses packet size detection to control traffic between several associated machines. Section III then describes an example electronic system with which some embodiments of the invention are implemented.

I. Example Forwarding Element Implementation

Figure 3:
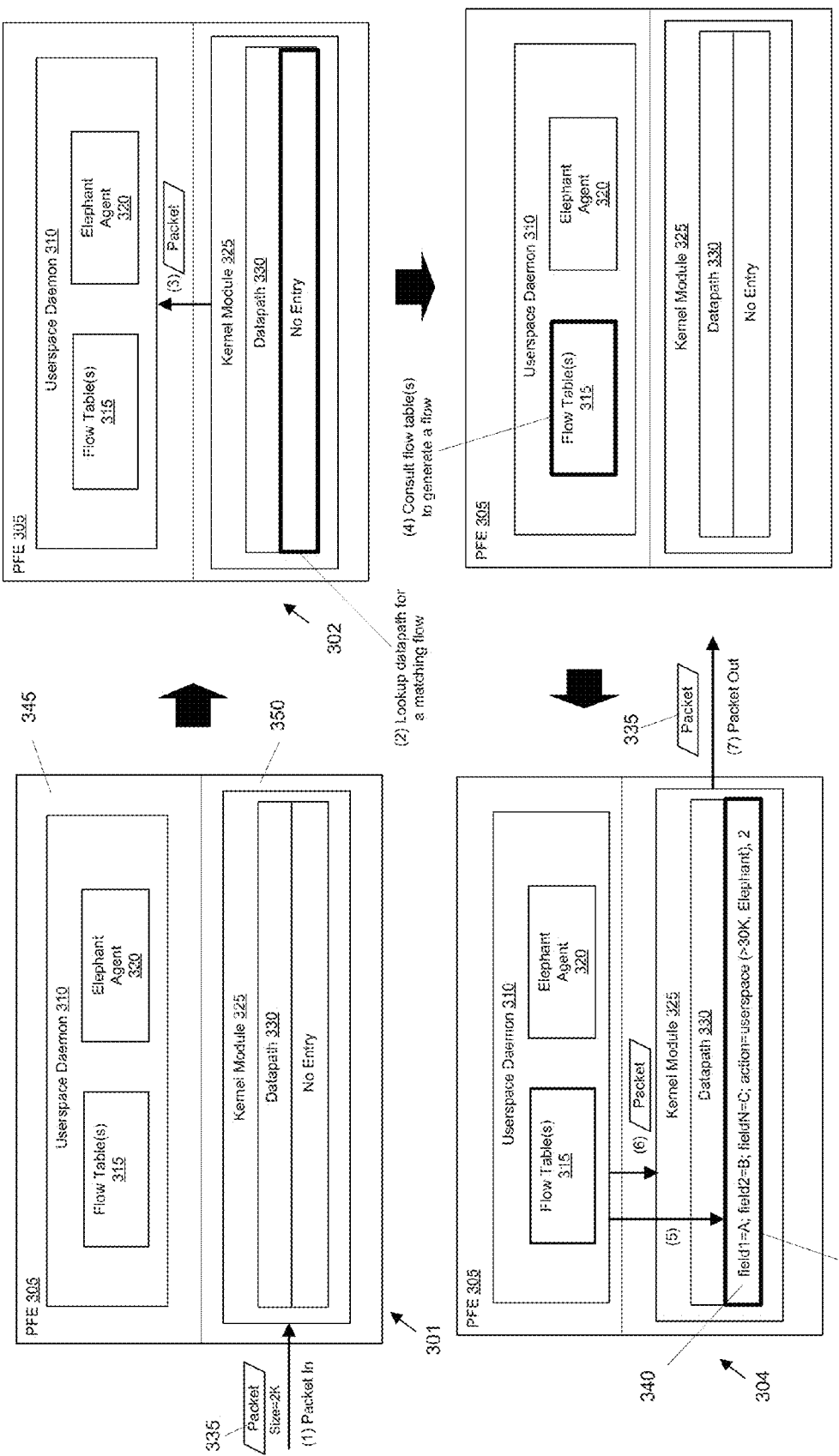
FIG. 3 provides an illustrative example of a physical forwarding element that examines the size of a packet to determine whether the data flow associated the packet is an elephant flow.

Having described an example process, an implementation of a forwarding element that examines packet size will now be described by FIG. 3-5. FIG. 3 provides an illustrative example of a physical forwarding element 305 that examines the size of a packet to determine whether the data flow associated the packet is an elephant flow. In the example of FIG. 3, the physical forwarding element 305 is a software forwarding element (e.g., Open Virtual Switch (OVS)) with a userspace daemon 310 and a kernel module 325. However, one of ordinary skill in the art would understand that this example and other examples described herein are equally applicable to hardware forwarding elements.

As shown in FIG. 3, the kernel module 325 operates in the kernel space 350, and the userspace daemon 310 operates in the userspace 345. The kernel 350 of some embodiments provides a fast path to process incoming packets. In some embodiments, when the physical forwarding element 305 receives a packet, the kernel module 325 first checks a datapath 330 (also referred to as a datapath cache) to determine if there is a flow that matches the packet. The kernel module 325 may iterate through a number of flow entries in the datapath 330 before finding one matching entry. If there is one, the kernel module 325 processes the packet using the flow entry's associated set of actions. As an example, depending on the set of actions, the kernel module 325 might drop the packet or output the packet to one or more of the physical forwarding element's output ports.

If there is a miss in the datapath, the control is shifted from the kernel module 325 to the userspace daemon 310. In some embodiments, the control is shifted so that a translation can occur at the userspace to generate and push a flow or rule into the datapath. The userspace daemon 310 operates (e.g., as a daemon or background process) in the userspace 345 to handle such a case when there is no matching flow in the datapath 330.

The userspace daemon 310 of some embodiments installs flows in the datapath 330 following on one or more flow entries from a set of one or more flow tables 315. The set of flow tables 315 are maintained in the userspace 345 rather than the kernel space 350, in some embodiments. When there is a miss in the datapath 330, the userspace daemon 310 may install a rule in the datapath based on a flow entry from a flow table. In this manner, the physical forwarding element 305 can quickly process each subsequent packet with the same set of header values using the rule in the datapath 330. The datapath 330 provides a fast path to process incoming packets because it does not involve any translation at the userspace 345 with the userspace daemon 310.

An example of the physical forwarding element 305 installing a rule to monitor packet size will now be described by reference to the four stages 301-304 that are shown in FIG. 3. The first stage 301 illustrates the physical forwarding element 305 with no flows in the datapath 330. The datapath 330 might be empty because the physical forwarding element 305 has not received any packets, or one or more of the flows in the datapath has expired or timed out.

In the first stage 301, the physical forwarding element 305 receives a packet 335. The second stage 302 shows the physical forwarding element 305 finding no matching flow for the packet 335 in the datapath 330. In particular, the kernel module 325 has consulted the datapath to find a matching flow for the packet 335. As there is no flow in the datapath 330, the kernel module 325 has called the userspace daemon 310 to handle the miss.

In some embodiments, when there is no matching flow, the kernel module 325 sends the packet to the userspace daemon 310. The userspace daemon 310 then performs a lookup operation (e.g., a hash-based lookup) to find one or more matching flows in a set of one or more flow tables 315. If a match is found, the userspace daemon 310 sends the packet back to kernel module 325 with a set of one or more actions to perform on the packet. The userspace daemon 310 also pushes a flow to the datapath 330 to process each subsequent packet with the same set of packet header values.

In the third stage 303, the userspace daemon 325 consults one or more flow tables 315 to generate a flow 340 to store in the datapath 330. The fourth stage 304 shows the datapath 330 after the flow 340 has been stored in datapath. The flow 340 includes a set of match fields and a set of action to perform on each packet that have a set of header values that match the set of match fields. To simplify the description, the match fields are listed as, field1 through field N. Each of these fields could be a number of different fields. Examples of such fields include source MAC address, destination MAC address, source IP address, destination IP address, source port number, destination port number, the protocol in use, etc.

To examine the size of a packet, the physical forwarding element 305 of some embodiments installs a flow with a conditional action. Typically, an action specifies dropping the packet or outputting the packet to one or more ports. However, the flow 340 includes a condition action. This action specifies that, if the packet exceeds a certain size, the packet should be sent to the userspace 345 for further processing. Otherwise, if the packet does not exceed the certain size, then the packet should be output to a particular port (e.g., port 2).

In the example of FIG. 3, the condition is specifies identifying any packet that is greater than a particular size (e.g., 30 KB). The flow entry also includes a number of labels. The "userspace" label identifies that the flow entry is associated with a "userspace" action. The "Elephant" label identifies the reason why the packet has been chosen to be sent to the userspace 345. The flow entry also includes a number, which represents the port to output the packet if the packet size is not greater than the particular size. The fourth stage 304 shows the physical forwarding element 305 after installing a flow 340 in the datapath 330. Here, the kernel module continues to process the packet 335 by outputting the packet through the specified output port.

In the example described above, the physical forwarding element 305 stores a flow entry 340 with a conditional action in the datapath 330. The conditional action specifies outputting the packet to a particular port if the packet's size does not exceed a certain size. If it exceeds the certain size, the conditional action specifies sending the packet to the userspace for further processing. FIG. 4 illustrates an example of how the physical forwarding element 305 handles a packet having a size that is less than the size limit. This is followed by FIG. 5, which shows an example of how the physical forwarding element 305 handles a packet having a size that is greater than the size limit.

Figure 4:
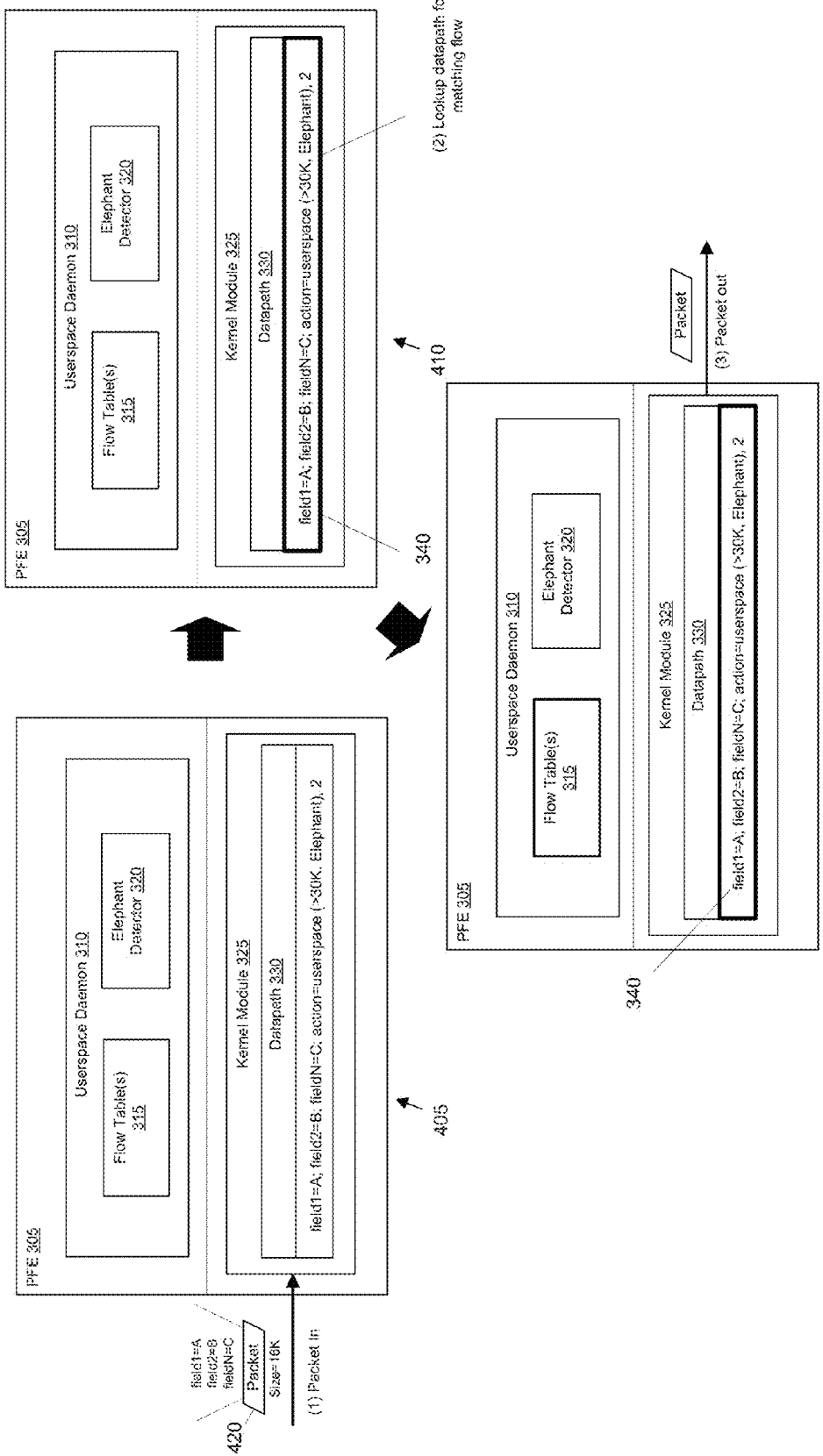
FIG. 4 illustrates an example of how the physical forwarding element handles a packet having a size that is less than the specified size limit.
Figure 5:
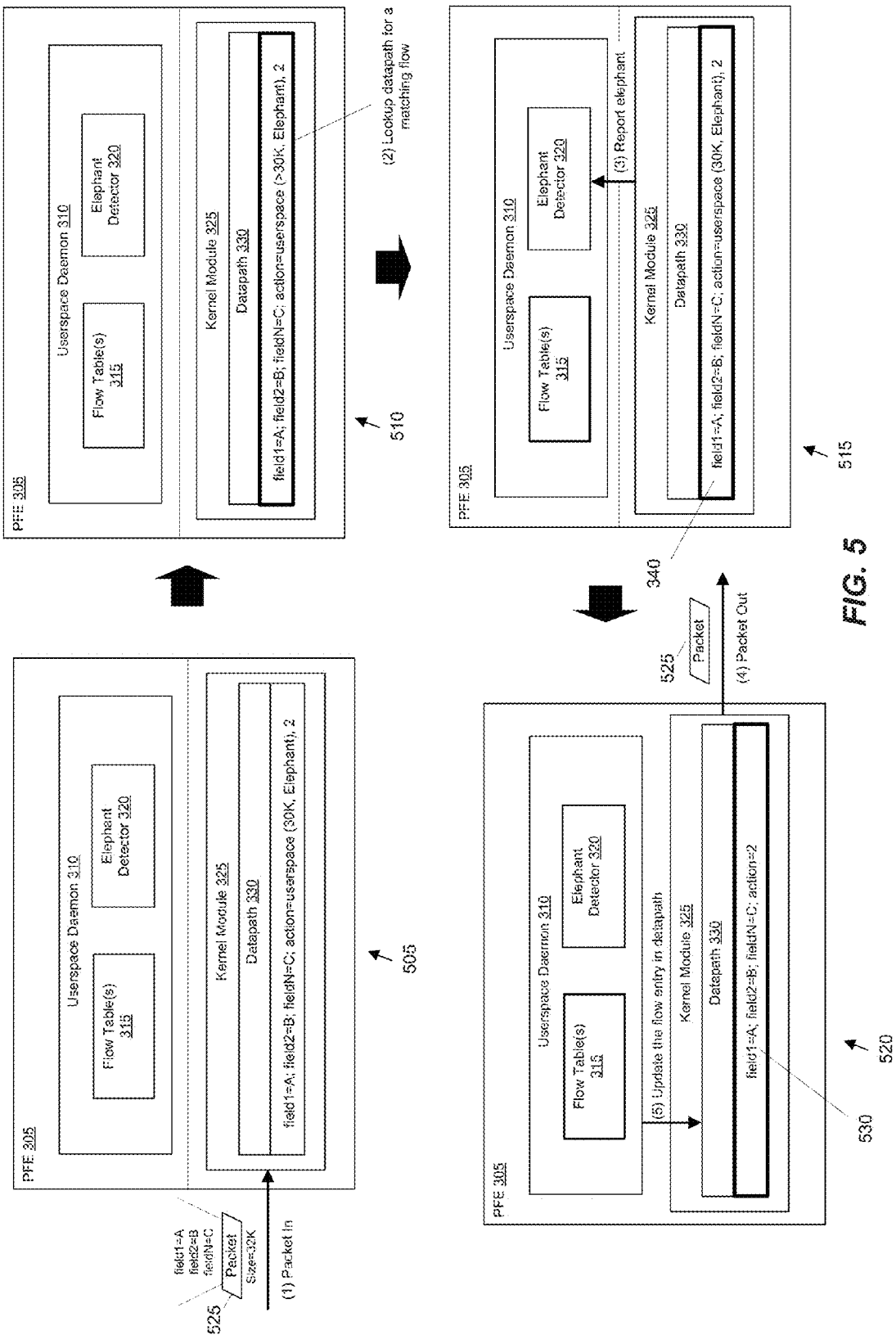
FIG. 5 shows an example of how the physical forwarding element handles a packet having a size that is greater than the specified size limit.

Three operational stages 405-415 of the physical forwarding element 305 are shown in FIG. 4. These stages 405-415 are a continuation of the ones shown in the previous figure. Here, the physical forwarding element receives another packet 420 that is associated with the same data flow in the same TCP session. Also, the size of the packet has increased from 2 KB to 16 KB. The size is still less than the size limit, which is 30 KB.

The first stage 405 shows the physical forwarding element 305 receiving the packet 420. The packet 420 is shown with its size, namely 16 KB. The packet 420 also has header values that match the match field values of the flow entry 340 in the datapath 330.

In the second stage 410, the kernel module 325 performs a lookup against one or more flows in the datapath 330 to find a matching flow. In some embodiments, the kernel module 325 parses the packet to extract or strip its header values. The kernel module then performs a hash-based lookup using the packets' the header values. As the flow entry 340 is a match, the kernel module 325 selects the flow entry in order to process the packet 420.

The third stage 415 illustrates the kernel module 325 acting as an elephant flow detector. Specifically, the kernel module 325 applies the conditional action of the flow entry 340 to the packet 420. In this stage 415, the kernel module 325 identifies the size of the packet 420 and determines that it does not exceed a threshold value (e.g., 30K). Hence, the physical forwarding element 305 processes the packet 420 normally without performing the userspace action. In other words, the physical forwarding element 305 output the packet to a specified port and does not send the packet to the userspace daemon 310 for further processing.

In the example described above, the physical forwarding element 305 determines that the size of the packet does not exceed the specified size limit. Therefore, the physical forwarding element 305 processes the packet normally without reporting it to the userspace daemon 310. FIG. 5 illustrates example operations of the physical forwarding element 305 when it identifies a subsequent packet 525 (e.g., in the same TCP session) that exceeds the specified size limit. Four operational stage 505-520 of the physical forwarding element are shown in FIG. 5.

The first stage 505 shows the physical forwarding element 305 receiving the packet 525. The packet 525 is shown with its size, namely 32 KB. The packet 525 is larger than the one shown in the previous figure. The size of the packet 525 also exceeds the specified size limit, which is 30 KB. The packet 525 has header values that match the match field values of the flow entry 340 in the datapath 330. In the second stage 510, the kernel module 325 performs a lookup against one or more flows in the datapath 330 to find a matching flow. In some embodiments, the kernel module 325 parses the packet to extract or strip its header values. The kernel module then performs a hash-based lookup using the packets' the header values. As the flow entry 340 is a match, the kernel module 325 selects the flow entry in order to process the packet 525.

The third stage 515 illustrates the kernel module 325 acting as an elephant flow detector. Specifically, the kernel module 325 applies the conditional action of the flow entry 340 to the packet 525. In this stage 515, the kernel module 325 identifies the size of the packet 420 and determines that it does exceed a threshold value (e.g., 30K). As the size limit has been reached, the physical forwarding element 305 treats the packet 525 differently than the one shown in the previous figure. Specifically, the kernel module 325 reports the elephant flow by sending the packet 525 to the userspace daemon 310. In some embodiments, the userspace daemon 310 receives the packet and stores data relating to the elephant flow. Example of such data includes header values (e.g., a group of tuples) or any other piece of data (e.g., tunnel information) that can be used to identify each packet that belongs to the elephant flow. For instance, upon receiving the packet 525, the userspace daemon 310 might store a set of header values that identifies the data flow with a marking or label that identifies or indicates that the data flow is an elephant flow.

The fourth stage 520 illustrates the physical forwarding element 525 processing the packet associated with the elephant flow. Particularly, the userspace daemon 310 of some embodiments instructs the kernel module 325 to update the flow entry 340 in the datapath 330. In some embodiments, the userspace daemon 310 generates another flow entry without the conditional action. This is shown in the fourth stage 520 with the updated flow entry 530. The match field values of the flow entry 530 remains the same as the flow entry 320. However, the conditional action has been replaced with a traditional action. This action specifies outputting any matching packet to a particular output port (e.g., port 2). In addition to updating the flow entry 340, the physical forwarding element outputs the packet 525 through a specified output port.

The physical forwarding element 305 updates the flow entry 320 in the datapath to prevent another packet associated with the same data flow from being reported as one belonging to an elephant flow. That is, the physical forwarding element 305 updates the flow entry 320 to prevent multiple reports for the same elephant flow. Another reason that the physical forwarding element updates the flow entry 320 is because of the network delay that can be introduced with the control shifting from the fast path to the userspace, and the userspace daemon performing additional operations.

In some embodiments, when an elephant is detected, the physical forwarding element 305 identifies various pieces of information that can be used to identify packets belonging to the elephant flow. The physical forwarding element may identify tunnel information, such as the tunnel ID, the IP address of the source tunnel endpoint (e.g., the hypervisor), and the IP address of the destination tunnel endpoint. The physical forwarding element of some embodiments identifies the elephant flow packet's ingress port, source transport layer (e.g., UDP or TCP) port, destination transport layer port, Ethernet type, source Ethernet address, destination Ethernet address, source IP address, and/or destination IP address.

In the example described above, the physical forwarding element installs a flow in the datapath to monitor packet size. One of ordinary skill in the art would understand that this is just one of several different ways that the physical forwarding element can examine packet size. For instance, instead of using the kernel module as an elephant detector, the physical forwarding element may include one or more separate components to determine whether the traffic being sent contains large TCP segments.

In some embodiments, the physical forwarding element 305 is an edge forward element (EFE). Different from a non-edge forwarding element (NEFE), the EFE is in a unique position to identify elephant flows. The EFE has the advance over a NEFE in that it is the last forwarding element before one or more end machines (e.g., VMs, computing device). Thus, the EFE can more easily monitor traffic coming from and going to an end machine than a NEFE. The EFE of some embodiments also has the advantage over the NEFE because the NEFE may not be able to detect an elephant flow based on the size of a packet. For instance, a NEFE may never receive large TCP packets but only receive smaller MTU-sized packets.

In some embodiments, the forwarding element is an edge forwarding element that is in a unique position to check the sizes of different packets before they are segmented into MTU-sized packets by a network interface controller or card (NIC). This is important because a non-edge forwarding element that is not in such a unique position may not be able to detect an elephant flow based solely on packet size. For instance, if the MTU size is less than the threshold size, then the non-edge forwarding element will not be able to use packet size to differentiate packets belonging to elephant flows and other packets belonging to mice flows.

Figure 6:
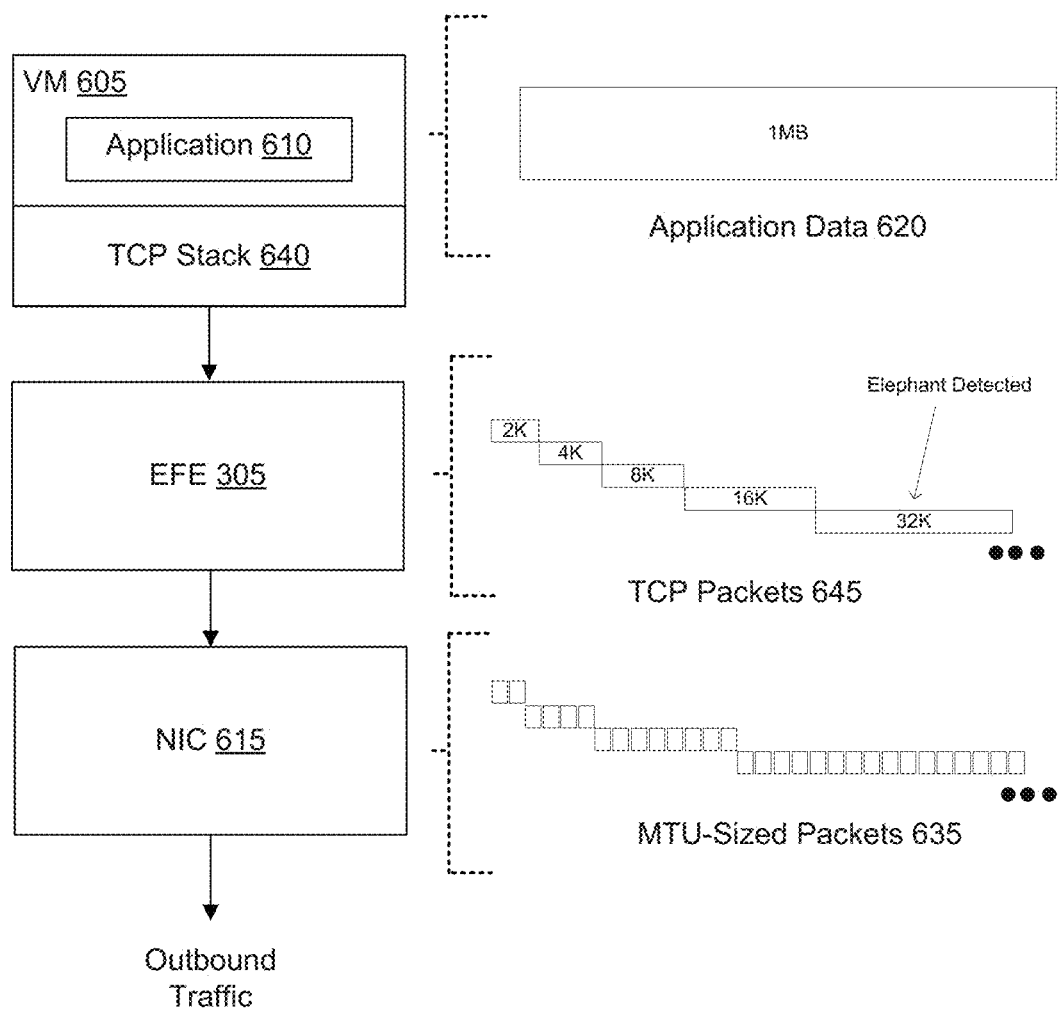
FIG. 6 conceptually illustrates an example of a forwarding element that is in a unique position to examine the different sizes of packets.

FIG. 6 conceptually illustrates an example of a forwarding element that is in a unique position to examine the different sizes of packets. The figure includes the EFE 305, a virtual machine (VM) 605, and a network interface card 615 (NIC). The NIC 615 may also be referred to as a network interface controller. The VM 605 and the EFE 305 may execute on a same host device (not shown). The NIC 615 may be a physical NIC component of that that host device.

As shown in FIG. 6, the VM 605 includes an application 610 with application data 620 to send over a TCP connection to a destination machine (not shown). The VM 605 has an operating system (OS) with a TCP stack 640. The TCP stack 640 conceptually represents the OS's implementation of a number of different protocols to send and receive data through a network. The TCP stack 640 may be a part of the OS's kernel. The TCP network stack is used to process data through several different layers. For instance, when outputting data from the machine, the data may be sent to a socket buffer and processed at the TCP layer to create TCP segments or packets. Each segment is then processed by a lower layer, such as the IP layer to add an IP header. The output of the network stack is a set of packets associated with the outbound data flow. Each packet may be processed (e.g., segmented) by the machine's NIC, and sent to the EFE 305. On the other hand, when receiving data at the machine, each packet may be processed by one or more of the layers in reverse order to strip one or more headers, and place the user data or payload in an input socket buffer.

In the example of FIG. 6, the application data is processed by the OS's TCP stack to produce TCP packets 620 (i.e., TCP segments). The EFE 305 receives the TCP packets 620 before handing them off to the NIC. Prior to handing the TCP packets 620 to the NIC 615, the EFE 305 might also examine the size of the packets. For instance, the EFE 305 may detect that the size of the TCP packet has increased such that it exceeds a threshold value. The EFE 305 might then specify the data flow associated with the TCP packet as an elephant flow.

As shown, the NIC 615 receives each TCP packet from the EFE 305. The NIC 615 also segments each TCP packet into a number of maximum transmission unit (MTU)-sized packets 635. As shown, each MTU-sized packet is smaller than at least some of the larger TCP packet. The MTU may also be less than the threshold packet size that is used to determine an elephant flow. Therefore, a NEFE (not shown) that receives and forwards the MTU-sized packets 635 from the NIC 615 may not be able to use the size of each MTU-sized packet to determine that the data flow is associated with the packets is an elephant flow. Thus, the EFE 305 is in a unique position in it can see TCP packets before they are segmented into MTU-sized packets, and sent over the network through the NIC 615.

II. Logical Forwarding Element

In some embodiments, the forwarding element (e.g., software or hardware forwarding element) is a physical forwarding element that operates in conjunction with one or more other physical forwarding elements to collectively implement different logical forwarding elements (e.g., logical switches, logical routers, etc.) for different logical networks of different tenants, users, departments, etc. that use the same shared computing and networking resources.

Figure 7:
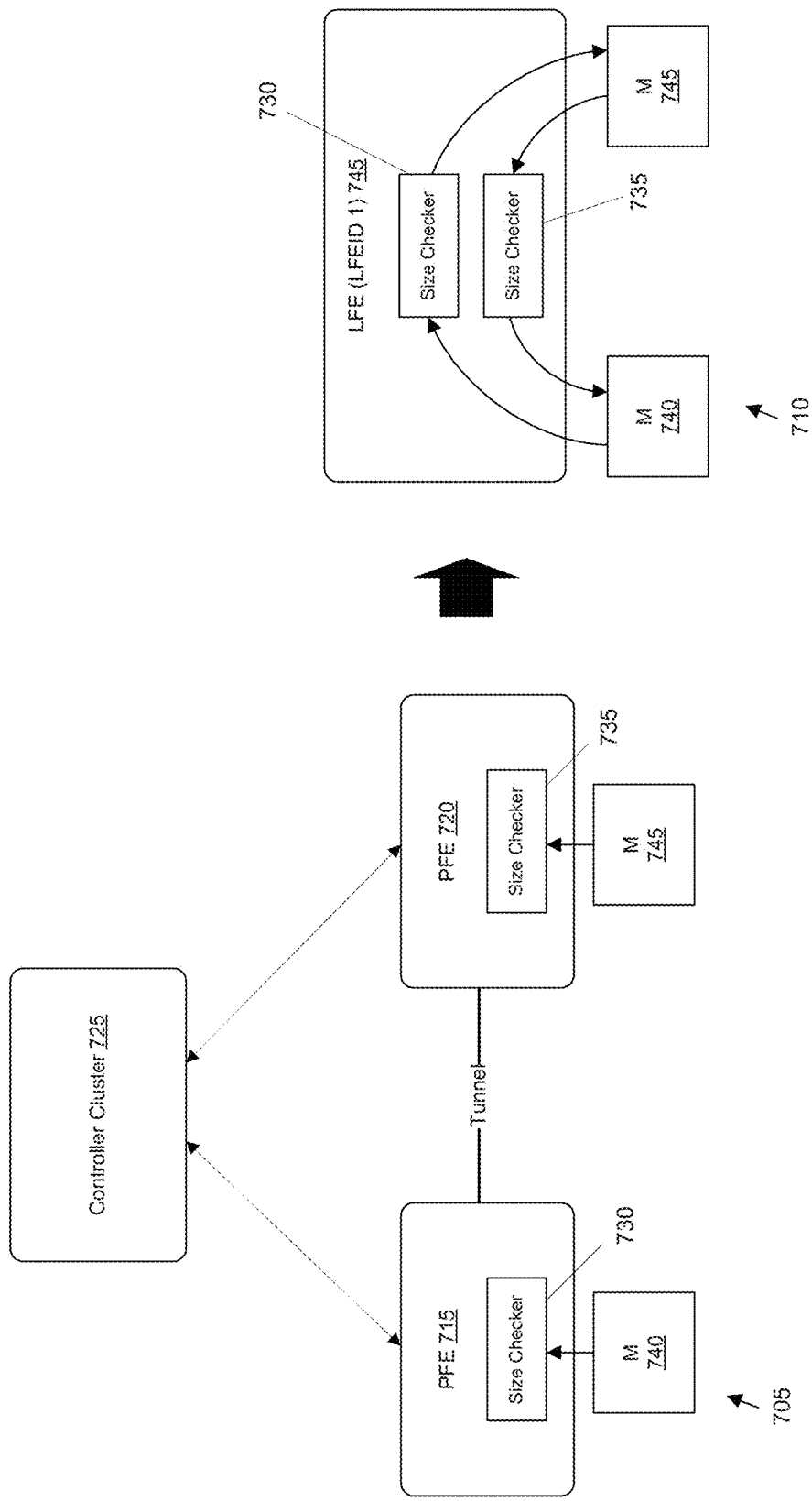
FIG. 7 conceptually illustrates an example logical forwarding element that uses packet size detection to monitor tunneled traffic between several associated machines.

FIG. 7 conceptually illustrates an example logical forwarding element 745 that uses packet size detection to monitor tunneled traffic between several associated machines. This figure shows a physical view 710 and a logical view 715 of the network. In the physical view 705, a network controller in a network controller cluster 725 manages and configures the physical forwarding elements 715 and 720 to implement the logical forwarding element 745.

In the example of FIG. 7, the network controller pushes management data to the physical forwarding elements 715 and 720 to establish a tunnel for the two machines 740 and 745 to communicate with one another (e.g., via a shared identifier, such as logical forwarding element identifier (LFEID), virtual network identifier, or tenant identifier). Hence, the tunnel extends the virtual network overlay between the two physical forwarding elements 715 and 720. The network controller may also push configuration data or flows (e.g., with conditional actions) to the physical forwarding elements.

As shown in the physical view 705, each physical forwarding element (715 or 720) examines the size of the packet sent from the corresponding machine (740 or 745) over the established tunnel. This is conceptually shown with a packet size checker (730 or 735) that operates on each forwarding element (715 or 720) to check the size of each packet sent from the corresponding machine (740 or 745).

The logical view 710 shows the logical forwarding element 745 that has been implemented with the instructions from the controller cluster 725. As shown, the logical forwarding element 745 performs elephant detection on each packet sent between the two machines 740 and 745. For instance, packets sent from the machine 740 to the machine 745 is examined by the size checker 730, while packets sent from the machine 745 to the machine 740 is examined by the size checker 735. Thus, the inbound and outbound traffic between these two machines 740 and 745 and are handled by the two size checkers 730 and 735.

One of the benefits of examining packet size to detect elephant flows is that it can be done without expending much computing resources. As shown in FIG. 7, another benefit of this detection approach is that it can be done on a per-tunnel basis. The disadvantage of this approach is that it may potentially only work with protocols that implement the slow start algorithm, such as TCP. In addition, depending on the network implementation, this approach may only be able to detect an elephant if the sender can send greater than maximum transmission unit MTU-sized packets.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
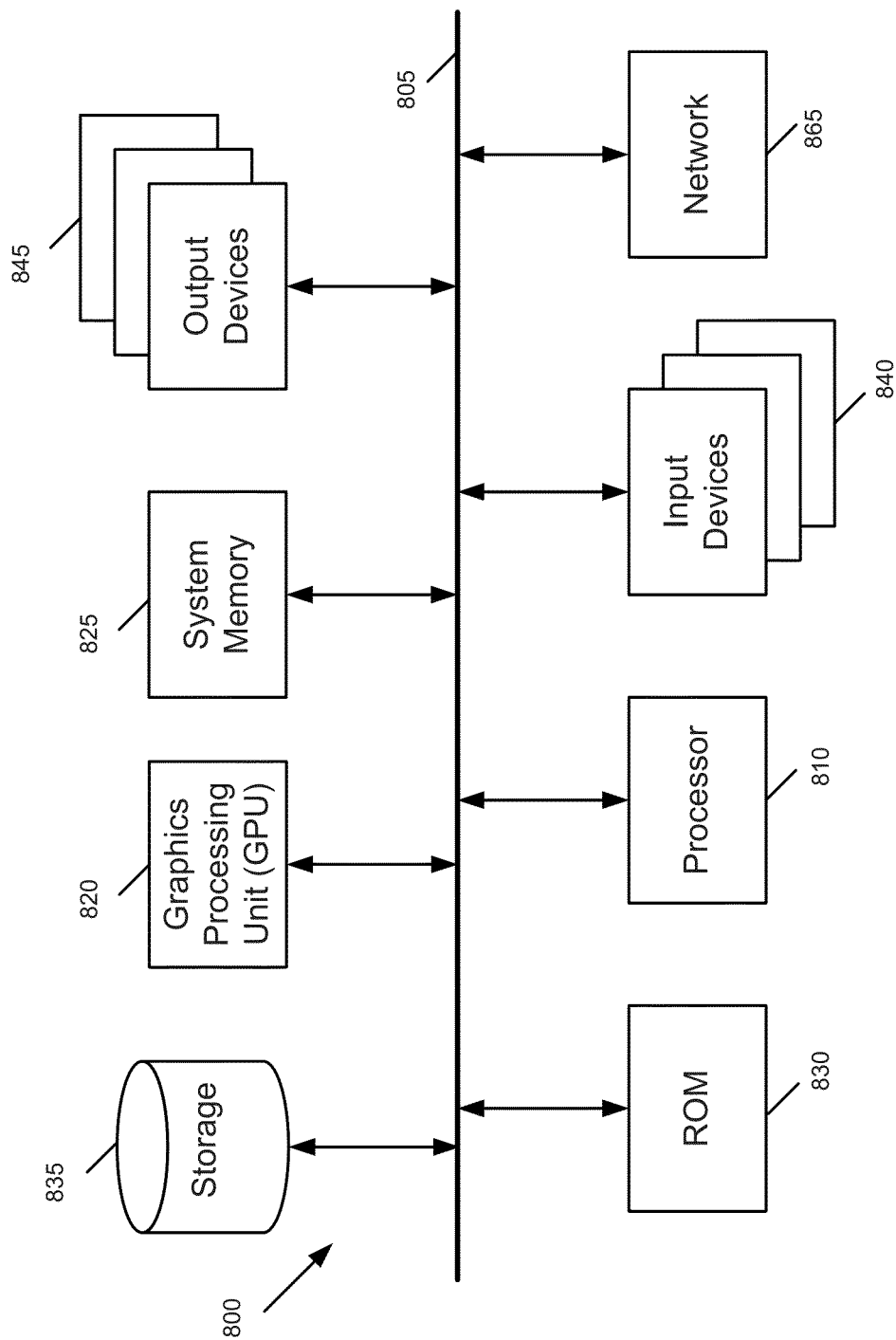
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash memory device, etc., and its corresponding drive) as the permanent storage device. Like the permanent storage device 835, the system memory 825 is a read-and-write memory device. However, unlike storage device 835, the system memory 825 is a volatile read-and-write memory, such a random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, FIG. 1 conceptually illustrates a process. As mentioned above, the specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process.

Thus, one of ordinary skill in the art would understand that the invention is not to be limited by the foregoing illustrative details, but rather is to be defined by the appended claims.

What is claimed is:

1. A non-transitory machine readable medium on which a program is stored, which when executed by at least one processing unit detects elephant flows, the program comprising sets of instructions for:
   receiving a packet associated with a data flow;
   when the size of the packet is below a threshold size, using a first flow entry to process the packet in a kernel space of the forwarding element; and
   when the size of the packet is over the threshold size:
      using the first flow entry to send the packet to a daemon;
      replacing the first flow entry with a second flow entry based on a response from the daemon, wherein the second flow entry processes subsequent packets of the data flow in the kernel space as packets of an elephant flow; and
      processing the packet based on the response from the daemon.

2. The non-transitory machine readable medium of claim 1, wherein the packet is associated with a protocol that utilizes a slow start algorithm in which the size of each packet increases with each successful transmission until the size of the packet size reaches a particular size or until a packet loss occurs.

3. The non-transitory machine readable medium of claim 2, wherein the protocol is Transmission Control Protocol (TCP).

4. The non-transitory machine readable medium of claim 1, wherein the set of instructions for using the first flow entry to process the packet comprises a set of instructions for sending the packet to a first port specified in the first flow entry, and the set of instructions for processing the packet based on the response from the daemon comprises a set of instructions for sending the packet to a second port specified in the response.

5. The non-transitory machine readable medium of claim 1, wherein the program does not examine the sizes of all packets but only examine the sizes of certain packets associated with one or more network hosts.

6. The non-transitory machine readable medium of claim 1, wherein the flow entries are stored in a flow table cache of the forwarding element to forward packets for a network host.

7. The non-transitory machine readable medium of claim 1, wherein the first flow entry comprises a conditional action to examine the size of the packet and the second flow entry does not include a conditional action to examine the size of the packet.

8. The non-transitory machine medium of claim 1, wherein the program further comprises a set of instructions for sending the packet to a network interface controller (NIC), wherein the NIC receives the packet and segments the packet into a set of one or more maximum transmission unit (MTU) sized packets.

9. The non-transitory machine readable medium of claim 8, wherein the MTU size is less than the threshold size.

10. The non-transitory machine readable medium of claim 1, wherein the set of instructions for using the first flow entry to send the packet to the daemon comprises a set of instructions for identifying information associated with the packet in order to identify other packets in the same elephant flow.

11. The non-transitory machine readable medium of claim 10, wherein the information includes at least one of tunnel information, an ingress port of the packet, a source transport layer protocol port number, a destination transport layer port number, an Ethernet type, a source Ethernet address, a destination Ethernet address, a source IP address, and a destination IP address.

12. For a forwarding element, a method of detecting elephant flows, the method comprising:
   receiving a packet associated with a data flow;
   when the size of the packet is below a threshold size, using a first flow entry to process the packet in a kernel space of the forwarding element; and
   when the size of the packet is over the threshold size:
      using the first flow entry to send the packet to a daemon;
      replacing the first flow entry with a second flow entry based on a response from the daemon, wherein the second flow entry processes subsequent packets of the data flow in the kernel space as packets of an elephant flow; and
      processing the packet based on the response from the daemon.

13. The method of claim 12, wherein the packet is associated with a protocol that utilizes a slow start algorithm in which the size of each packet increases with each successful transmission until the packet size reaches a particular size or until a packet loss occurs.

14. The method of claim 13, wherein the protocol is Transmission Control Protocol (TCP).

15. The method of claim 12, wherein the flow entries are stored in a flow table cache of the forwarding element to forward packets for a network host.

16. The method of claim 15, wherein the first flow entry comprises a conditional action to examine the size of the packet and the second flow entry does not include a conditional action to examine the size of the packet.

17. The method of claim 12 further comprising sending the packet to a network interface controller (NIC), wherein the NIC receives the packet and segments the packet into a set of one or more maximum transmission unit (MTU) sized packets.

18. The method of claim 12, wherein using the first flow entry to send the packet to the daemon comprises identifying information associated with the packet in order to identify other packets in the same elephant flow.

19. A network system comprising:
   a plurality of edge physical forwarding elements that are each directly coupled to at least one network host and configured to (i) examine packet sizes of packets from the coupled network hosts to detect elephant flows based on a threshold size for the packets, (ii) use a first flow entry to process a particular packet in a kernel space of the edge physical forwarding element when the size of the particular packet is below a threshold size, and (iii) when the particular packet is over the threshold size, use the first flow entry to send the packet to a daemon, replace the first flow entry with a second flow entry based on a response from the daemon, and process the packet based on the response from the daemon, wherein the second flow entry processes subsequent packets of the data flow in the kernel space as packets of an elephant flow; and
   a plurality of non-edge physical forwarding elements that are not directly coupled to any network hosts, wherein each non-edge physical forwarding element is configured to forward packets for the network hosts between edge physical forwarding elements.

20. The network of claim 19, wherein the plurality of edge physical forwarding elements and the plurality of non-edge physical forwarding elements collectively implement a number of logical forwarding elements for different entities.

* * * * *